United States Patent
Chuang et al.

(10) Patent No.: US 9,321,224 B2
(45) Date of Patent: Apr. 26, 2016

(54) INFRARED ABSORPTION FILM, INFRARED ABSORPTION FILM MANUFACTURING METHOD AND CAMERA MODULE COMPRISING THE INFRARED ABSORPTION FILM

(71) Applicant: TAIFLEX Scientific Co., Ltd., Kaohsiung (TW)

(72) Inventors: Chia-Che Chuang, Kaohsiung (TW); Yu-Chih Kao, Kaohsiung (TW); Chen-Kuo Lu, Kaohsiung (TW); Kuan-Yu Li, Kaohsiung (TW); Tzu-Ching Hung, Kaohsiung (TW); Chiu-Feng Chen, Kaohsiung (TW)

(73) Assignee: TAIFLEX Scientific Co., Ltd., Kaohsiung Export Processing Zone, Chienchen Dist., Kaohsiung (TW)

( * ) Notice: Subject to any disclaimer, the term of this patent is extended or adjusted under 35 U.S.C. 154(b) by 69 days.

(21) Appl. No.: 14/514,399

(22) Filed: Oct. 15, 2014

(65) Prior Publication Data
US 2016/0067932 A1 Mar. 10, 2016

(30) Foreign Application Priority Data
Sep. 10, 2014 (TW) .............................. 103131195 A

(51) Int. Cl.
| | |
|---|---|
| B29D 11/00 | (2006.01) |
| G02B 5/22 | (2006.01) |
| G03B 11/00 | (2006.01) |
| H04N 5/225 | (2006.01) |
| G02B 13/00 | (2006.01) |
| B29K 33/04 | (2006.01) |
| B29K 509/02 | (2006.01) |

(52) U.S. Cl.
CPC ........ *B29D 11/00634* (2013.01); *G02B 13/008* (2013.01); *H04N 5/2254* (2013.01); *B29K 2033/04* (2013.01); *B29K 2509/02* (2013.01)

(58) Field of Classification Search
CPC .. B29D 11/00634; G02B 13/008; G02B 5/22; G03B 11/00; H04N 5/2254; F21V 9/04
See application file for complete search history.

(56) References Cited

U.S. PATENT DOCUMENTS

| | | | | |
|---|---|---|---|---|
| 4,480,269 | A * | 10/1984 | Yoshida ............... | H04N 5/2254 348/342 |
| 2006/0203535 | A1* | 9/2006 | Ishii ......................... | G02F 1/15 365/151 |
| 2009/0116100 | A1* | 5/2009 | Ota .......................... | G02B 5/24 359/358 |
| 2015/0301245 | A1* | 10/2015 | Kawashima ......... | C08K 5/0091 348/342 |

FOREIGN PATENT DOCUMENTS

| | | |
|---|---|---|
| CN | 101441291 A | 5/2009 |
| CN | 103229100 A | 7/2013 |

* cited by examiner

*Primary Examiner* — W B Perkey
(74) *Attorney, Agent, or Firm* — Winston Hsu; Scott Margo

(57) ABSTRACT

An infrared absorption film includes a polymer resin substrate, a polymer dispersant and an infrared absorption material. The infrared absorption material has a plurality of tungsten oxide and/or composite tungsten oxide nanoparticles dispersed in the polymer resin substrate by the polymer dispersant, wherein a weight ratio of the polymer dispersant to the infrared absorption material is between 0.3 and 0.6.

15 Claims, 7 Drawing Sheets

INFRARED ABSORPTION FILM, INFRARED ABSORPTION FILM MANUFACTURING METHOD AND CAMERA MODULE COMPRISING THE INFRARED ABSORPTION FILM

BACKGROUND OF THE INVENTION

1. Field of the Invention

The present invention relates to an infrared absorption film, an infrared absorption film manufacturing method and a camera module comprising the infrared absorption film, and more particularly, to an infrared absorption film, an infrared absorption film manufacturing method and a camera module comprising the infrared absorption film capable of increasing product stability and infrared light filtering efficiency.

2. Description of the Prior Art

Generally, a camera module of a mobile phone comprises a complementary metal oxide semiconductor (CMOS) light sensing unit or a charge-coupled device (CCD) light sensing unit, for sensing light and generating image signals accordingly. Since the CMOS light sensing unit and the CCD light sensing unit are very sensitive to infrared. In order to prevent the light sensing unit from receiving infrared, which causes image color distortion, the camera module of the mobile phone is arranged with an infrared cut-off filter. In the prior art, the camera module of the mobile phone generally utilizes a blue glass filter as an infrared cut-off filter for absorbing infrared. However, the blue glass filter is mainly made of phosphate, which has bad weather resistance and stability, such that the camera module using the blue glass filter has bad product stability. Moreover, when the blue glass filter is affected by external environment to deteriorate, infrared light filtering efficiency of the blue glass filter is affected as well, so as to reduce image quality of the camera module. In addition, since the blue glass filter is friable and heavy, the above factors may increase design difficulty of the camera module.

SUMMARY OF THE INVENTION

The present invention provides an infrared absorption film, an infrared absorption film manufacturing method and a camera module comprising the infrared absorption film, in order to solve problems of the prior art.

The infrared absorption film of the present invention comprises a polymer resin substrate, a polymer dispersant and an infrared absorption material. The infrared absorption material has a plurality of tungsten oxide and/or composite tungsten oxide nanoparticles dispersed in the polymer resin substrate by the polymer dispersant, wherein a weight ratio of the polymer dispersant to the infrared absorption material is between 0.3 and 0.6.

The infrared absorption film manufacturing method of the present invention comprises adding an infrared absorption material and a polymer dispersant into a solvent to form a dispersion liquid, the infrared absorption material having a plurality of tungsten oxide and/or composite tungsten oxide powders; grinding the dispersion liquid to form a first slurry, wherein the powders of tungsten oxide and/or composite tungsten oxide are grinded into nanoparticles; mixing the first slurry with a polymer resin for forming a second slurry; applying the second slurry with a predetermined thickness on a film; and drying the second slurry to form an infrared absorption film; wherein a weight ratio of the polymer dispersant to the infrared absorption material is between 0.3 and 0.6.

The camera module of the present invention comprises a lens module, a light sensing unit and an infrared absorption film. The light sensing unit is configured to sense light passing through the lens module for generating image signals. The infrared absorption film is arranged between the lens module and the light sensing unit. The infrared absorption film comprises a polymer resin substrate, a polymer dispersant and an infrared absorption material. The infrared absorption material has a plurality of tungsten oxide and/or composite tungsten oxide nanoparticles dispersed in the polymer resin substrate by the polymer dispersant, wherein a weight ratio of the polymer dispersant to the infrared absorption material is between 0.3 and 0.6.

In contrast to the prior art, the infrared absorption film and the manufacturing method of the present invention can disperse the tungsten oxide and/or composite tungsten oxide nanoparticles in the polymer resin substrate more evenly, in order to increase infrared light filtering efficiency of the infrared absorption film. In addition, a blue glass filter of the camera module can be replaced by the infrared absorption film of the present invention for working as an infrared cut-off filter, so as to increase product stability of the camera module, and reduce design difficulty of the camera module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
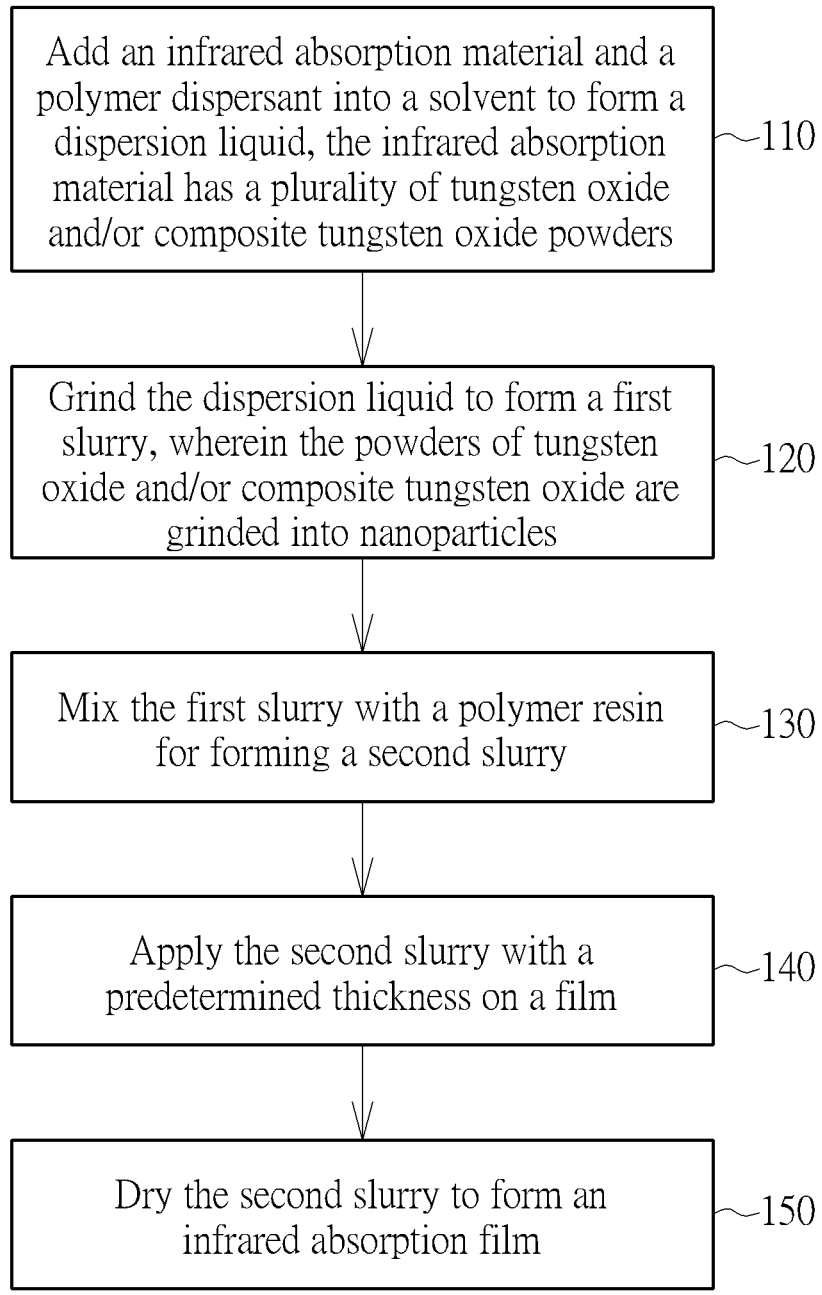
FIG. 1 is a diagram illustrating an infrared absorption film manufacturing method of the present invention.
Figure 2:
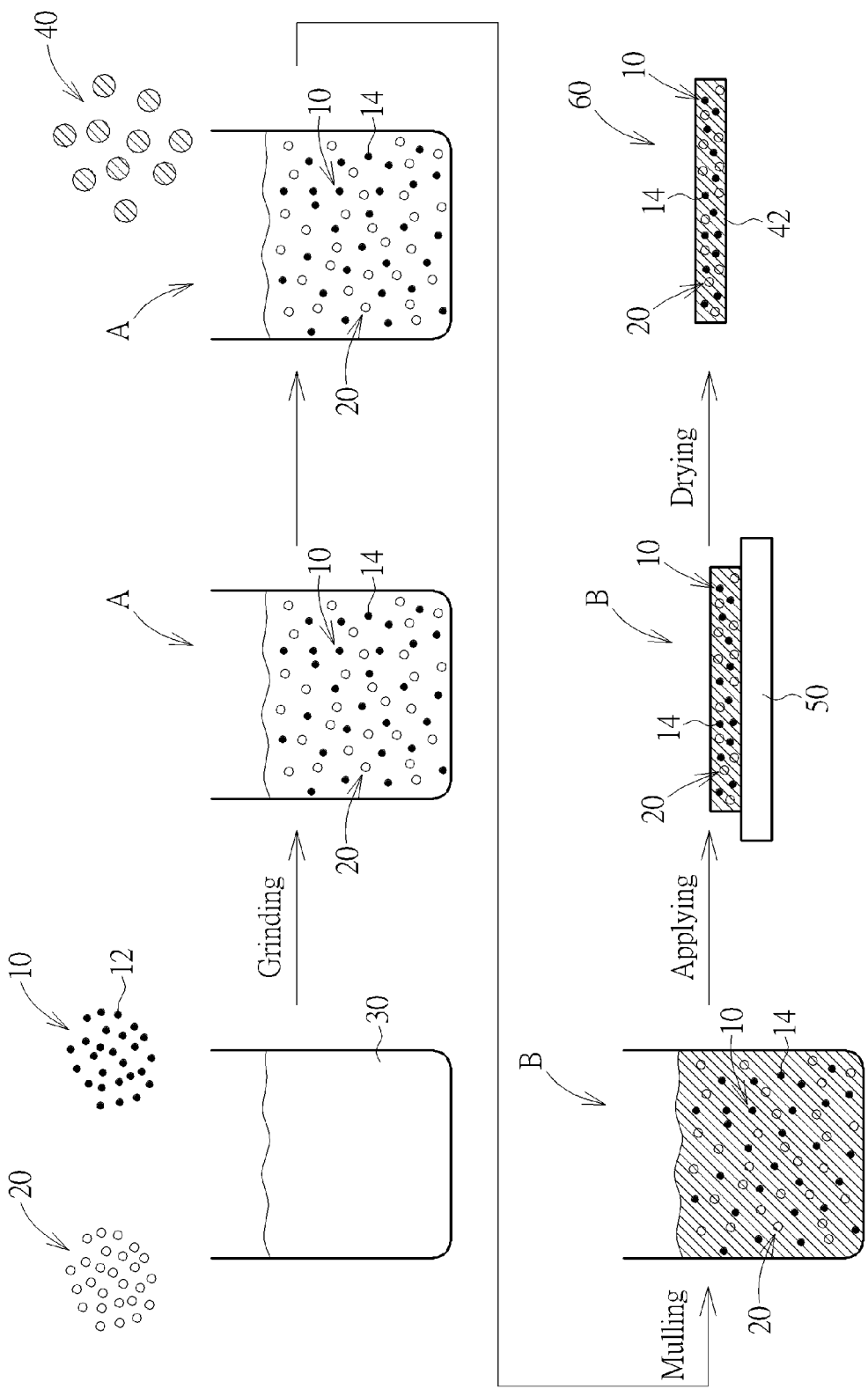
FIG. 2 is a flowchart showing the infrared absorption film manufacturing method of the present invention.

Please refer to FIG. 1 and FIG. 2 together. FIG. 1 is a diagram illustrating an infrared absorption film manufacturing method of the present invention. FIG. 2 is a flowchart showing the infrared absorption film manufacturing method of the present invention. As shown in figures, in step 110, the manufacturing method of the present invention adds an infrared absorption material 10 and a polymer dispersant 20 into a solvent 30 to form a dispersion liquid. The infrared absorption material 10 can have a plurality of tungsten oxide and/or composite tungsten oxide powders 12. For example, the tungsten oxide powders is expressed by a general formula $W_yO_z$, W is tungsten, O is oxygen, and $2.2 < z/y < 3$; and the composite tungsten oxide powders is expressed by a general formula $M_xW_yO_z$, M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 < x/y < 1$, and $2.2 < z/y < 3$. The above tungsten oxide and the composite tungsten oxide powders have better weather resistance and stability, and are excellent in absorbing infrared.

In step 120, the manufacturing method of the present invention grinds the dispersion liquid to form a first slurry A, wherein the powders 12 of tungsten oxide and/or composite tungsten oxide are grinded into nanoparticles 14, in order to prevent occurrence of light scattering when visible light passes through the infrared absorption film. After forming the first slurry A, in step 130, the manufacturing method of the present invention further mixes the first slurry A with a polymer resin 40 for forming a second slurry B. The polymer resin 40 is for forming a substrate of the infrared absorption film. The first slurry A and the polymer resin 40 can be mixed by mulling. After forming the second slurry B, in step 140, the manufacturing method of the present invention further applies the second slurry B with a predetermined thickness on a film 50, such as applying the second slurry B on a release film. Thereafter, in step 150, the manufacturing method of the present invention dries the second slurry B for volatilizing the solvent in the second slurry B, and removes the release film 50, in order to form an infrared absorption film 60.

In the infrared absorption film manufacturing method of the present invention, a weight ratio of the polymer dispersant 20 to the infrared absorption material 10 is between 0.3 and 0.6, that is, when the weight of the infrared absorption material 10 is 100 grams, the weight of the polymer dispersant 20 is from 30 grams to 60 grams. Under the above weight ratio, the tungsten oxide and/or composite tungsten oxide nanoparticles 14 can be dispersed in a polymer resin substrate 42 by the polymer dispersant 20 more evenly, so as to further increase infrared light filtering efficiency of the infrared absorption film.

For example, in a first embodiment of the present invention, the manufacturing method of the present invention adds 20 parts by weight of the cesium tungsten oxide ($Cs_xW_yO_z$) infrared absorption material and 10 parts by weight of the polymer dispersant (such as acrylic type polymer dispersant) into 70 parts by weight of a methyl ethyl ketone (MEK) solvent to form the dispersion liquid. Then the dispersion liquid is grinded by 1 mm diameter yttrium zirconium beads to obtain the first slurry. Thereafter, the first slurry and an acrylic resin are mixed to obtain the second slurry, and a weight ratio of the cesium tungsten oxide infrared absorption material to the acrylic resin is 3:7. The second slurry is further applied with a predetermined thickness (such as 25 μm) on the release film and dried, in order to obtain the infrared absorption film after removing the release film.

Figure 3:
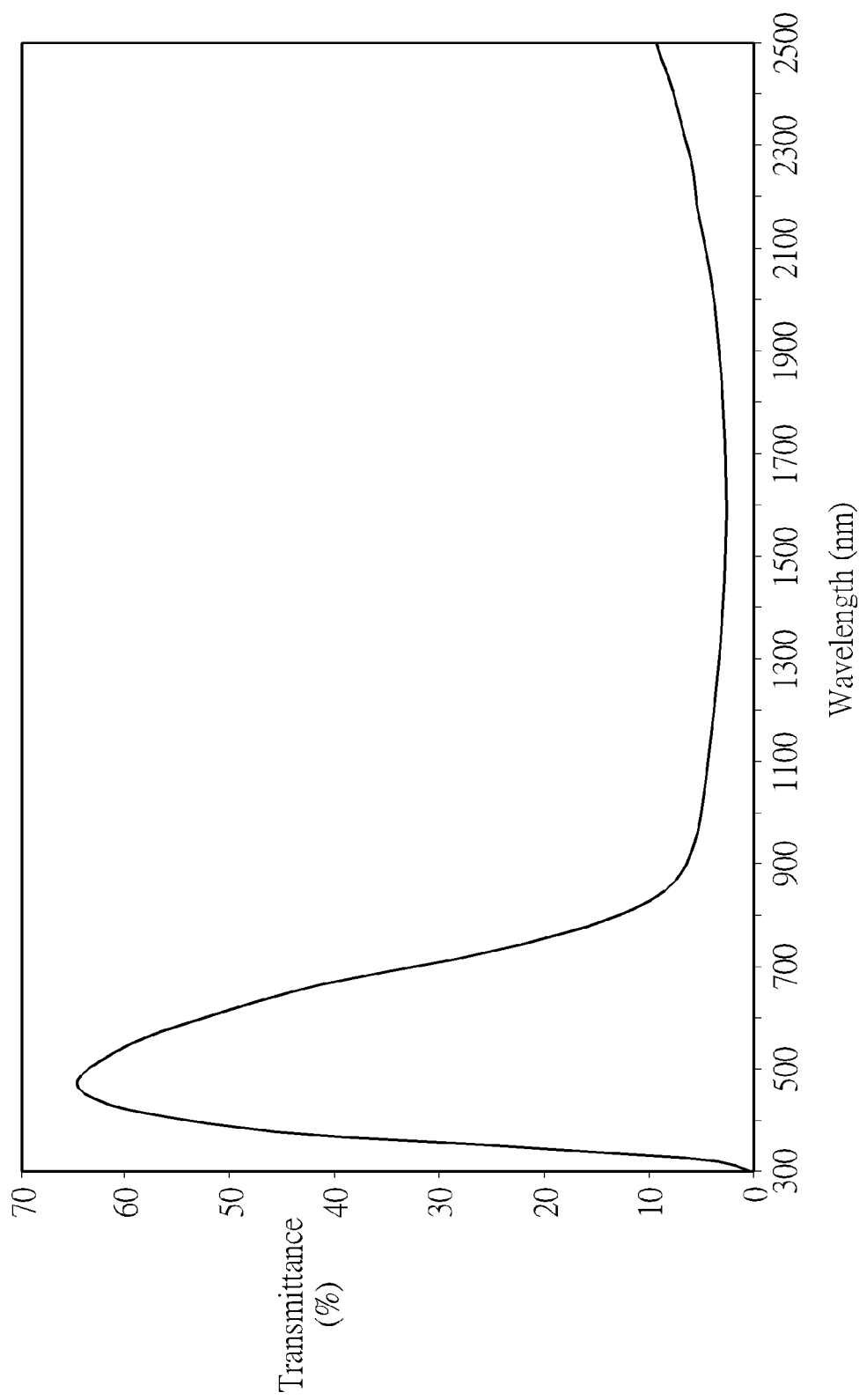
FIG. 3 is a diagram showing an optical character curve of the infrared absorption film according to a first embodiment of the present invention.

As shown in FIG. 3, the first embodiment of the infrared absorption film of the present invention can effectively block infrared and allow visible light to pass through. Moreover, in the present embodiment, the weight ratio of the polymer dispersant to the cesium tungsten oxide infrared absorption material is 0.5. Under the above weight ratio, the cesium tungsten oxide nanoparticles can be dispersed in the acrylic resin substrate by the polymer dispersant more evenly, so as to further increase infrared light filtering efficiency of the infrared absorption film.

In a second embodiment of the present invention, the manufacturing method of the present invention adds 20 parts by weight of the cesium tungsten oxide infrared absorption material and 10 parts by weight of the polymer dispersant into 70 parts by weight of the MEK solvent to form the dispersion liquid. Then the dispersion liquid is grinded by 1 mm diameter yttrium zirconium beads to obtain the first slurry. Thereafter, the first slurry and the acrylic resin are mixed to obtain the second slurry, and a weight ratio of the cesium tungsten oxide infrared absorption material to the acrylic resin is 1:9. The second slurry is further applied with a predetermined thickness (such as 70 μm) on the release film and dried, in order to obtain the infrared absorption film after removing the release film.

Figure 4:
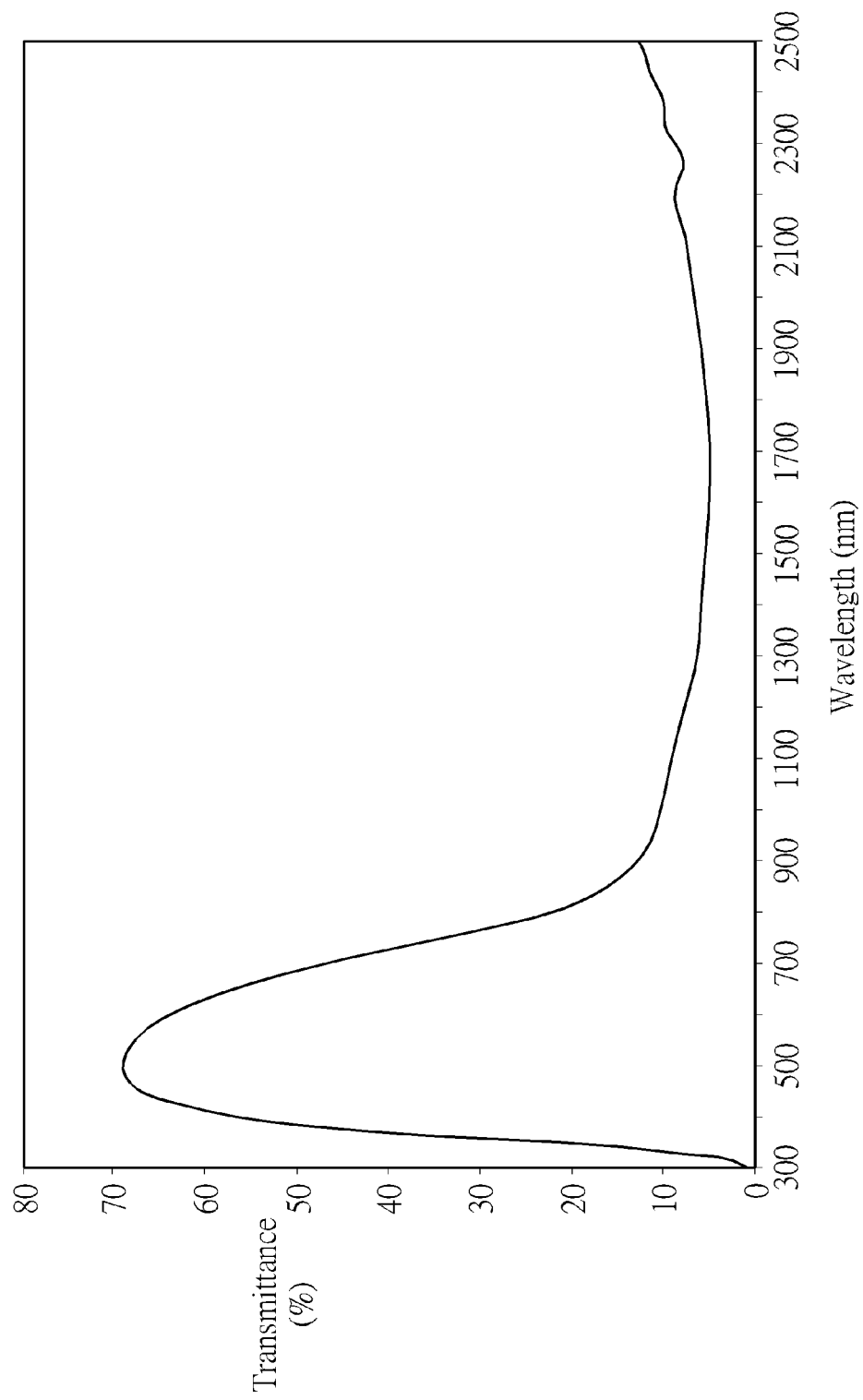
FIG. 4 is a diagram showing an optical character curve of the infrared absorption film according to a second embodiment of the present invention.

As shown in FIG. 4, the second embodiment of the infrared absorption film of the present invention can effectively block infrared and allow visible light to pass through. Moreover, in the present embodiment, the weight ratio of the polymer dispersant to the cesium tungsten oxide infrared absorption material is 0.5. Under the above weight ratio, the cesium tungsten oxide nanoparticles can be dispersed in the acrylic resin substrate by the polymer dispersant more evenly, so as to further increase infrared light filtering efficiency of the infrared absorption film.

In a third embodiment of the present invention, the manufacturing method of the present invention adds 20 parts by weight of the cesium tungsten oxide infrared absorption material and 6 parts by weight of the polymer dispersant into 74 parts by weight of a toluene solvent to form the dispersion liquid. Then the dispersion liquid is grinded by 1 mm diameter yttrium zirconium beads to obtain the first slurry. Thereafter, the first slurry and a cyclic olefin copolymer (COC) resin are mixed to obtain the second slurry, and a weight ratio of the cesium tungsten oxide infrared absorption material to the COC resin is 1:2. The second slurry is further applied with a predetermined thickness (such as 25 μm) on the release film and dried, in order to obtain the infrared absorption film after removing the release film.

Figure 5:
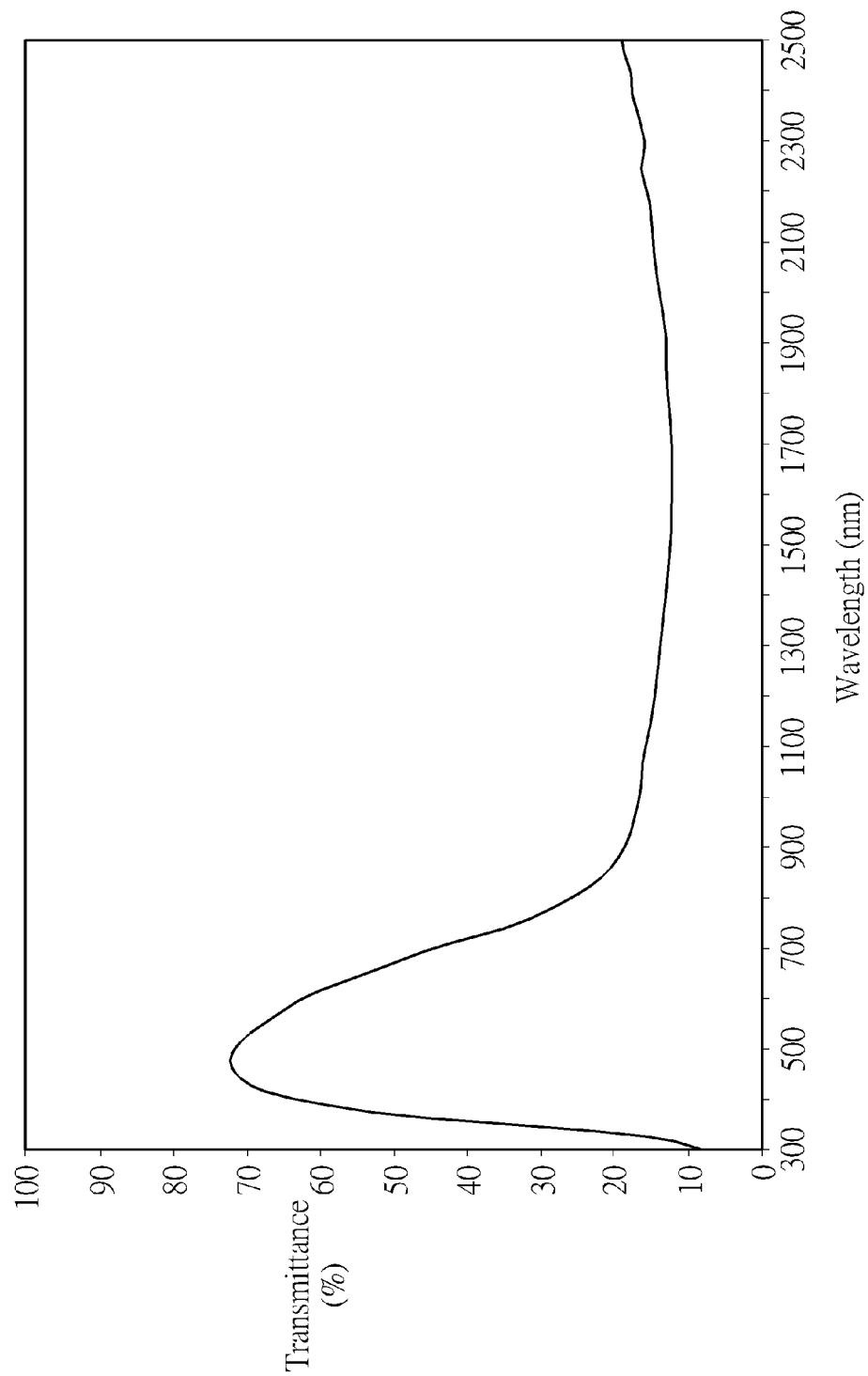
FIG. 5 is a diagram showing an optical character curve of the infrared absorption film according to a third embodiment of the present invention.

As shown in FIG. 5, the third embodiment of the infrared absorption film of the present invention can effectively block infrared and allow visible light to pass through. Moreover, in the present embodiment, the weight ratio of the polymer dispersant to the cesium tungsten oxide infrared absorption material is 0.3. Under the above weight ratio, the cesium tungsten oxide nanoparticles can be dispersed in the COC resin substrate by the polymer dispersant more evenly, so as to further increase infrared light filtering efficiency of the infrared absorption film.

In a fourth embodiment of the present invention, the manufacturing method of the present invention adds 20 parts by weight of the cesium tungsten oxide infrared absorption material and 10 parts by weight of the polymer dispersant into 70 parts by weight of the MEK solvent to form the dispersion liquid. Then the dispersion liquid is grinded by 1 mm diameter yttrium zirconium beads to obtain the first slurry. Thereafter, the first slurry and an ultraviolet-curing resin are mixed to obtain the second slurry, and a weight ratio of the cesium tungsten oxide infrared absorption material to the ultraviolet-curing resin is 1:2. The second slurry is further applied with a predetermined thickness (such as 55 μm) on the release film and dried, in order to obtain the infrared absorption film after removing the release film.

Figure 6:
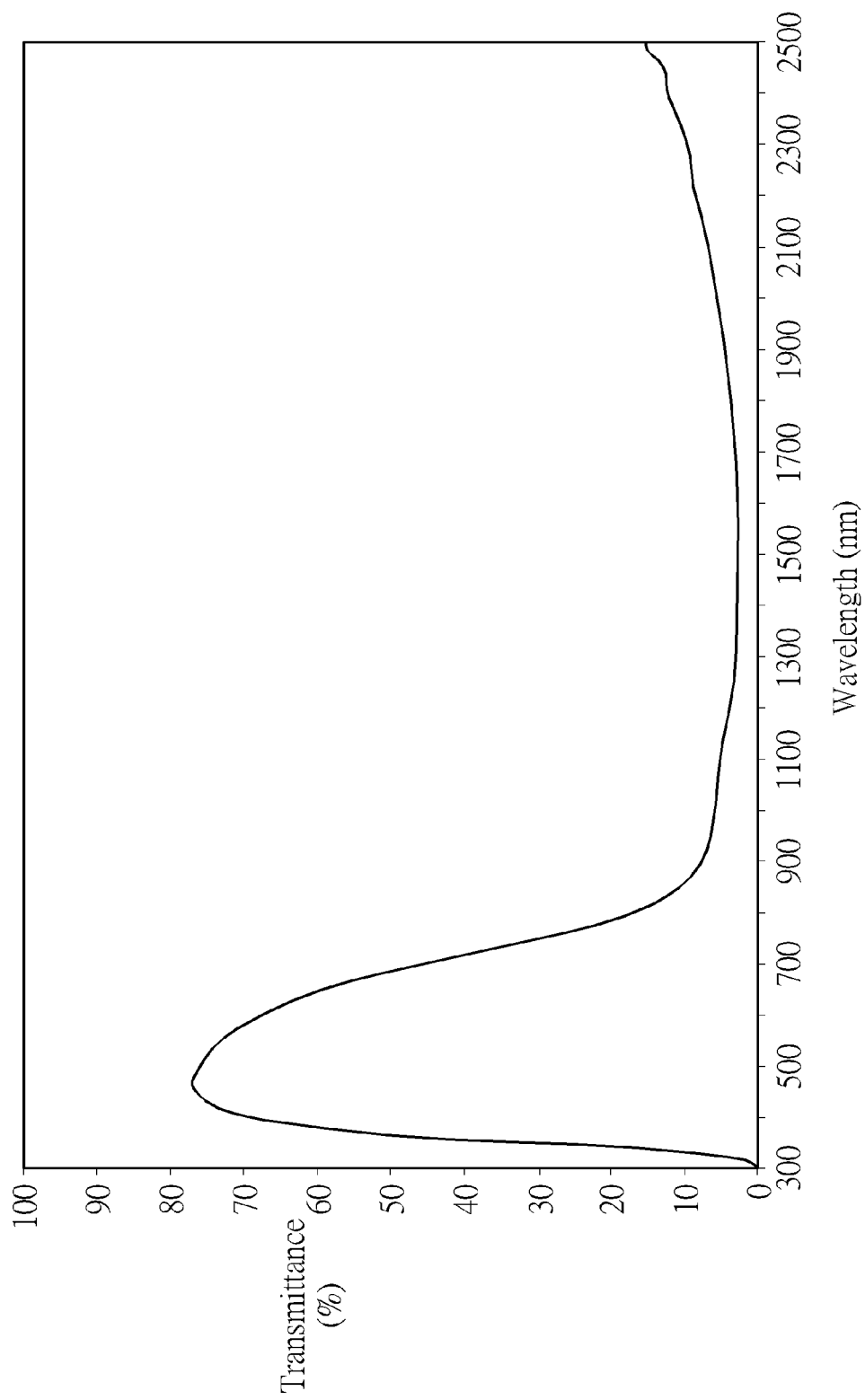
FIG. 6 is a diagram showing an optical character curve of the infrared absorption film according to a fourth embodiment of the present invention.

As shown in FIG. 6, the fourth embodiment of the infrared absorption film of the present invention can effectively block infrared and allow visible light to pass through. Moreover, in the present embodiment, the weight ratio of the polymer dispersant to the cesium tungsten oxide infrared absorption material is 0.5. Under the above weight ratio, the cesium tungsten oxide nanoparticles can be dispersed in the ultraviolet-curing resin substrate by the polymer dispersant more evenly, so as to further increase infrared light filtering efficiency of the infrared absorption film.

According to the above arrangement, the infrared absorption film 60 of the present invention comprises the polymer resin substrate 42, the polymer dispersant 20 and the infrared absorption material 10. And the infrared absorption material 10 has a plurality of tungsten oxide and/or composite tungsten oxide nanoparticles 14 dispersed in the polymer resin substrate 42 by the polymer dispersant 20. Moreover, in the infrared absorption film 60 of the present invention, the weight ratio of the polymer dispersant 20 to the infrared absorption material 10 is between 0.3 and 0.6, such that the tungsten oxide and/or composite tungsten oxide nanoparticles 14 can be dispersed in the polymer resin substrate 42 by the polymer dispersant 20 more evenly, so as to further increase infrared light filtering efficiency of the infrared absorption film 60.

In addition, the first embodiment to the fourth embodiment of the present invention are illustrated as examples, ingredients and forming ratios of the infrared absorption film 60 are not limited to the above embodiments. The polymer resin substrate 42 of the infrared absorption film 60 of the present invention can be made of any material selected from polyethylene resin, polyvinyl chloride resin, polyvinylidene chloride resin, polyvinyl alcohol resin, polystyrene resin, polypropylene resin, ethyl vinyl acetate copolymer stretched, polyester resin, polyethylene terephthalate resin, fluorine resin, polycarbonate resin, acrylic resin, polyvinyl butyral resin.

Figure 7:
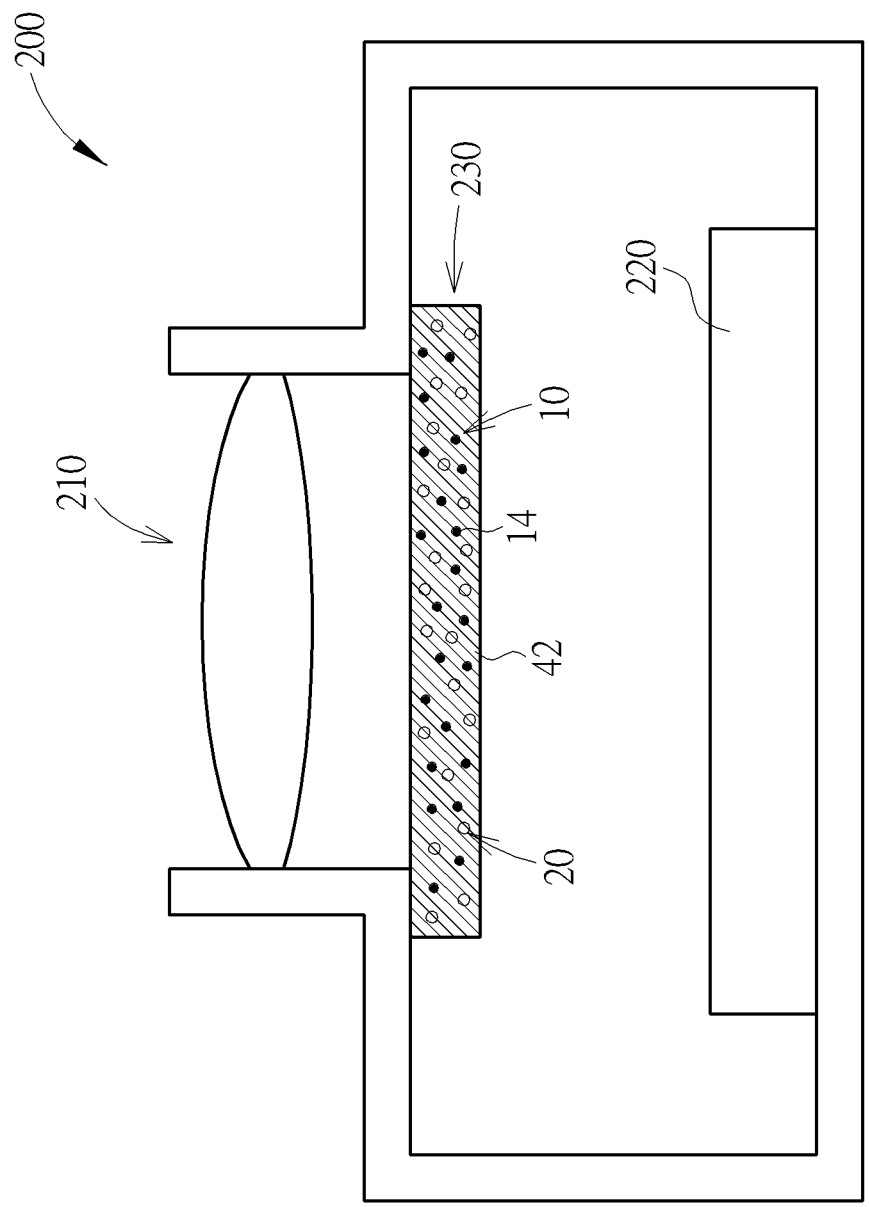
FIG. 7 is a diagram showing a camera module of the present invention.

Please refer to FIG. 7. FIG. 7 is a diagram showing a camera module of the present invention. As shown in FIG. 7, the camera module 200 comprises a lens module 210, a light sensing unit 220 and an infrared absorption film 230. The lens module 210 comprises at least one lens. The light sensing unit 220 is configured to sense light passing through the lens module 210 for generating image signals. The infrared absorption film 230 is arranged between the lens module 210 and the light sensing unit 220 for absorbing infrared. The infrared absorption film 230 is formed according to the above manufacturing method, but not limited to the first embodiment to the fourth embodiment. The infrared absorption film comprises the polymer resin substrate 42, the polymer dispersant 20 and the infrared absorption material 10. The infrared absorption material 10 has a plurality of tungsten oxide and/or composite tungsten oxide nanoparticles 14 dispersed in the polymer resin substrate 42 by the polymer dispersant 20. A weight ratio of the polymer dispersant 20 to the infrared absorption material 10 is between 0.3 and 0.6.

According to the above arrangement, since the tungsten oxide and the composite tungsten oxide nanoparticles have better weather resistance and stability, and are excellent in absorbing infrared, the infrared absorption film 230 of the present invention can replace a blue glass filter for working as an infrared cut-off filter, in order to increase product stability of the camera module 200. Moreover, the infrared absorption film 230 of the present invention is non-friable and lightweight, thus the infrared absorption film 230 of the present invention can reduce design difficulty of the camera module 200.

In contrast to the prior art, the infrared absorption film and the manufacturing method of the present invention can disperse the tungsten oxide and/or composite tungsten oxide nanoparticles in the polymer resin substrate more evenly, in order to increase infrared light filtering efficiency of the infrared absorption film. In addition, the blue glass filter of the camera module can be replaced by the infrared absorption film of the present invention for working as an infrared cut-off filter, so as to increase product stability of the camera module, and reduce design difficulty of the camera module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An infrared absorption film, comprising:
   a polymer resin substrate;
   a polymer dispersant; and
   an infrared absorption material, having a plurality of tungsten oxide and/or composite tungsten oxide nanoparticles dispersed in the polymer resin substrate by the polymer dispersant;
   wherein a weight ratio of the polymer dispersant to the infrared absorption material is between 0.3 and 0.6.

2. The infrared absorption film of claim 1, wherein the polymer resin substrate is made of an acrylic resin.

3. The infrared absorption film of claim 1, wherein the polymer resin substrate is made of a cyclic olefin copolymer resin.

4. The infrared absorption film of claim 1, wherein the polymer resin substrate is made of an ultraviolet-curing resin.

5. The infrared absorption film of claim 1, wherein:
   the tungsten oxide nanoparticles is expressed by a general formula $W_yO_z$, W is tungsten, O is oxygen, and $2.2 < z/y < 3$; and
   the composite tungsten oxide nanoparticles is expressed by a general formula $M_xW_yO_z$, M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 < x/y < 1$, and $2.2 < z/y < 3$.

6. An infrared absorption film manufacturing method, comprising:
   adding an infrared absorption material and a polymer dispersant into a solvent to form a dispersion liquid, the infrared absorption material having a plurality of tungsten oxide and/or composite tungsten oxide powders;
   grinding the dispersion liquid to form a first slurry, wherein the powders of tungsten oxide and/or composite tungsten oxide are grinded into nanoparticles;
   mixing the first slurry with a polymer resin for forming a second slurry;
   applying the second slurry with a predetermined thickness on a film; and
   drying the second slurry to form an infrared absorption film;
   wherein a weight ratio of the polymer dispersant to the infrared absorption material is between 0.3 and 0.6.

7. The manufacturing method of claim 6, wherein the solvent is a methyl ethyl ketone solvent, and the polymer resin is an acrylic resin.

8. The manufacturing method of claim 6, wherein the solvent is a toluene solvent, and the polymer resin is a cyclic olefin copolymer resin.

9. The manufacturing method of claim 6, wherein the solvent is methyl ethyl ketone solvent, and the polymer resin is an ultraviolet-curing resin.

10. The manufacturing method of claim 6, wherein:
    the tungsten oxide powders is expressed by a general formula $W_yO_z$, W is tungsten, O is oxygen, and $2.2 < z/y < 3$; and
    the composite tungsten oxide powders is expressed by a general formula $M_xW_yO_z$, M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001<x/y<1$, and $2.2<z/y<3$.

11. A camera module, comprising:

a lens module;

a light sensing unit, configured to sense light passing through the lens module for generating image signals; and an infrared absorption film, arranged between the lens module and the light sensing unit, the infrared absorption film comprising:

a polymer resin substrate;

a polymer dispersant; and an infrared absorption material, having a plurality of tungsten oxide and/or composite tungsten oxide nanoparticles dispersed in the polymer resin substrate by the polymer dispersant;

wherein a weight ratio of the polymer dispersant to the infrared absorption material is between 0.3 and 0.6.

12. The camera module of claim 11, wherein the polymer resin substrate is made of an acrylic resin.

13. The camera module of claim 11, wherein the polymer resin substrate is made of a cyclic olefin copolymer resin.

14. The camera module of claim 11, wherein the polymer resin substrate is made of an ultraviolet-curing resin.

15. The camera module of claim 11, wherein:

the tungsten oxide nanoparticles is expressed by a general formula $W_yO_z$, W is tungsten, O is oxygen, and $2.2<z/y<3$; and the composite tungsten oxide nanoparticles is expressed by a general formula $M_xW_yO_z$, M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001<x/y<1$, and $2.2<z/y<3$.

* * * * *